Feb. 14, 1933.　　　　T. J. ROGERS　　　　1,897,768
MEANS FOR LIGHTING AIRPORTS
Filed Aug. 5, 1929　　　5 Sheets-Sheet 1

Inventor
T. J. Rogers
By Whiteley and Ruckman
Attorneys

Feb. 14, 1933.   T. J. ROGERS   1,897,768
MEANS FOR LIGHTING AIRPORTS
Filed Aug. 5, 1929.   5 Sheets-Sheet 2

Inventor:
T. J. Rogers
By Whiteley and Ruckman
Attorneys.

Feb. 14, 1933. T. J. ROGERS 1,897,768
MEANS FOR LIGHTING AIRPORTS
Filed Aug. 5, 1929 5 Sheets-Sheet 3

Inventor:
T. J. Rogers.
By Whiteley and Ruckman
Attorneys.

Feb. 14, 1933.  T. J. ROGERS  1,897,768
MEANS FOR LIGHTING AIRPORTS
Filed Aug. 5, 1929.  5 Sheets-Sheet 4
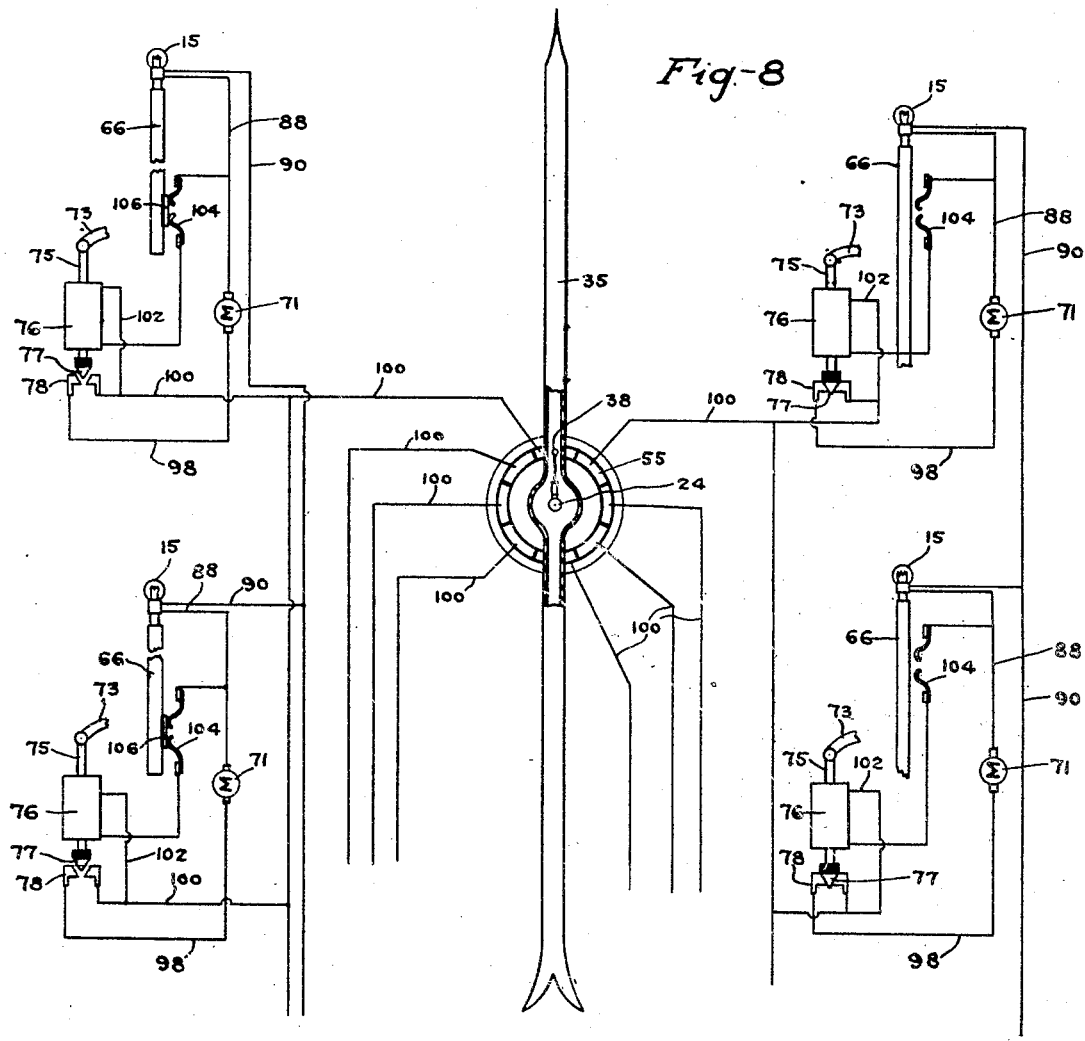
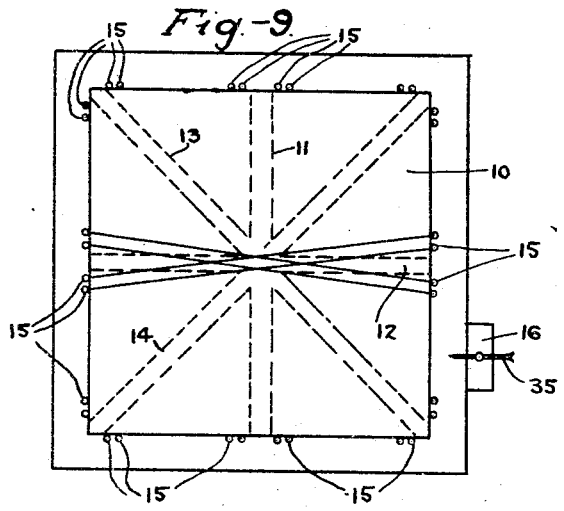
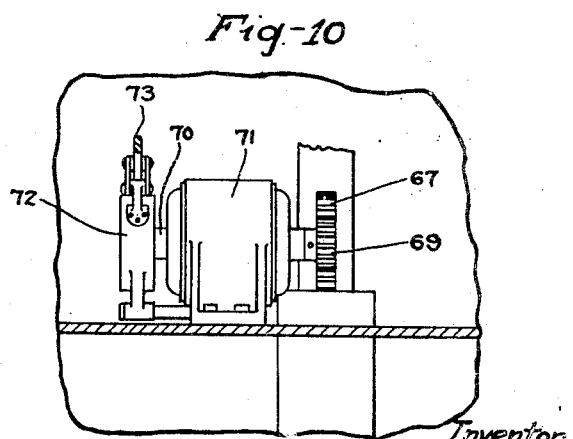
Inventor
T. J. Rogers
By Whiteley and Ruckman
Attorneys.

Feb. 14, 1933.

T. J. ROGERS 1,897,768

MEANS FOR LIGHTING AIRPORTS

Filed Aug. 5, 1929       5 Sheets-Sheet 5

Inventor:
T. J. Rogers.
By Whiteley and Ruckman
Attorneys.

Patented Feb. 14, 1933

1,897,768

UNITED STATES PATENT OFFICE

THOMAS J. ROGERS, OF MINNEAPOLIS, MINNESOTA

MEANS FOR LIGHTING AIRPORTS

Application filed August 5, 1929. Serial No. 383,664.

My invention relates to means for lighting airports and has for an object particularly to provide a wind vane control for closing electrical circuits in accordance with the direction of the wind to operate lights of an airport. In general, the construction of this application is adapted to be used in connection with an airport lighted as shown in my co-pending application Serial Number 376,025, wherein landing lanes running in the direction of the wind are lighted by sunken lights. As the invention of the present application relates generally to the wind vane apparatus and its relation to the operation of said light lanes and to the construction and operation of flood lights which are raised on that side of the field toward which the wind is blowing, the particular construction and arrangement of said sunken lights are only generally referred to. By the use of the wind vane apparatus, I am able to provide a landing field which is entirely free of poles for supporting lights. Another object is to provide an illuminated wind vane which will indicate to the pilot, the direction of wind whereby he may more readily effect a landing at night.

The full objects and advantages of my invention will appear in connection with the detailed description thereof, and the novel features of my inventive idea will be particularly pointed out in the claims.

Figure 1:
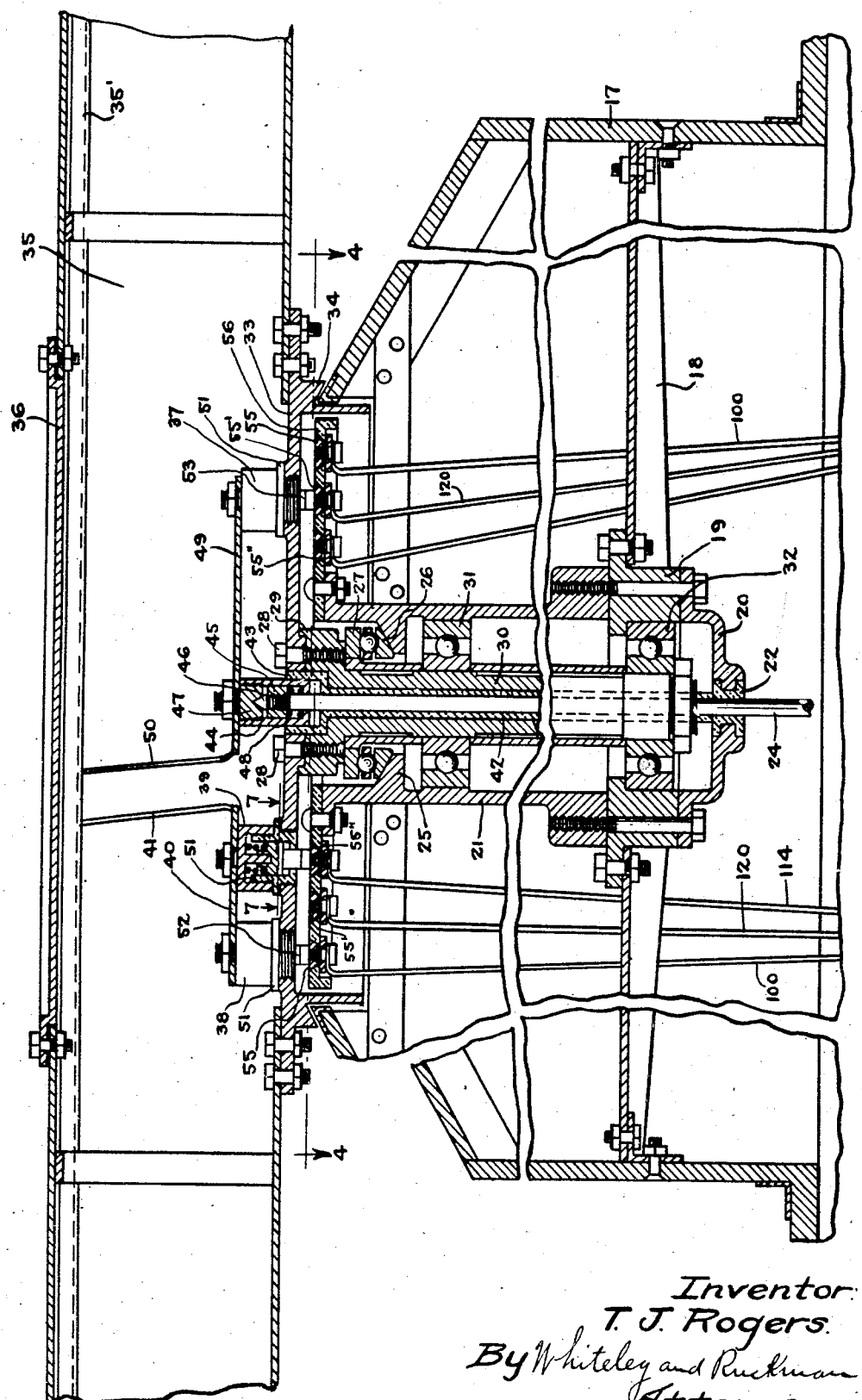
Figure 2:
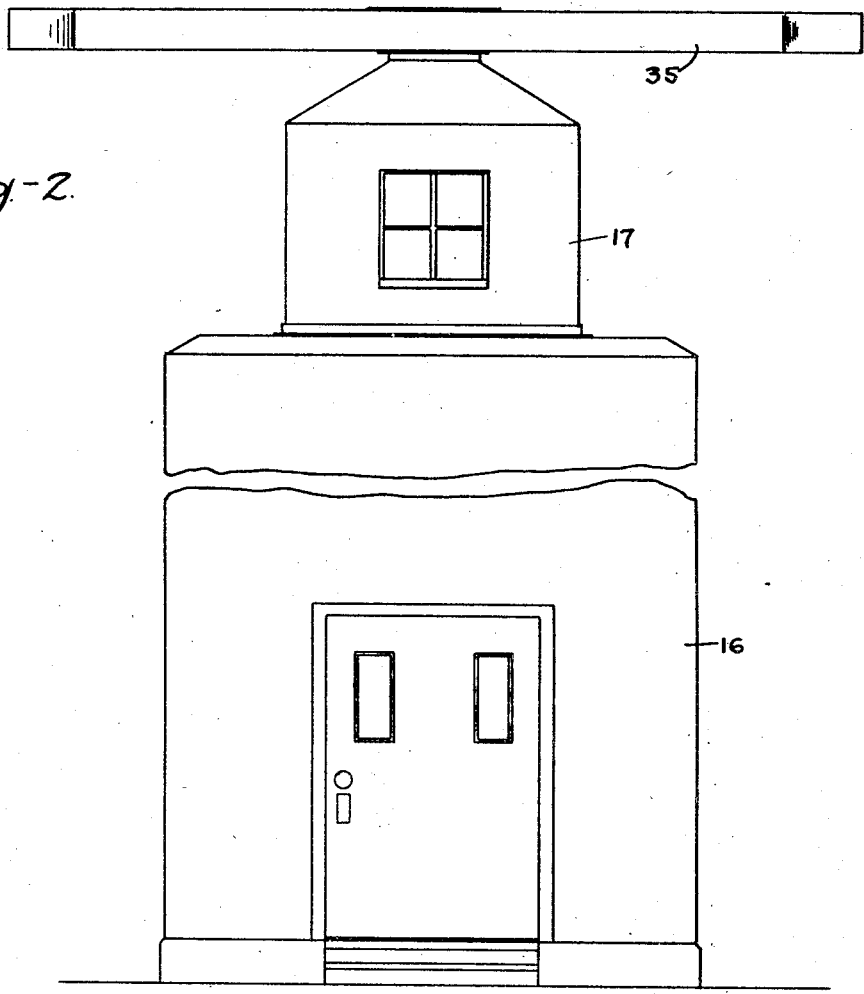
Figure 3:
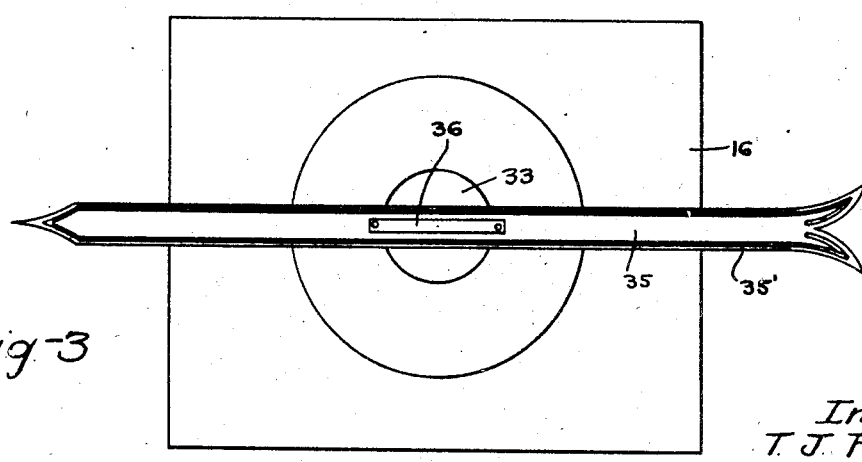
Figure 4:
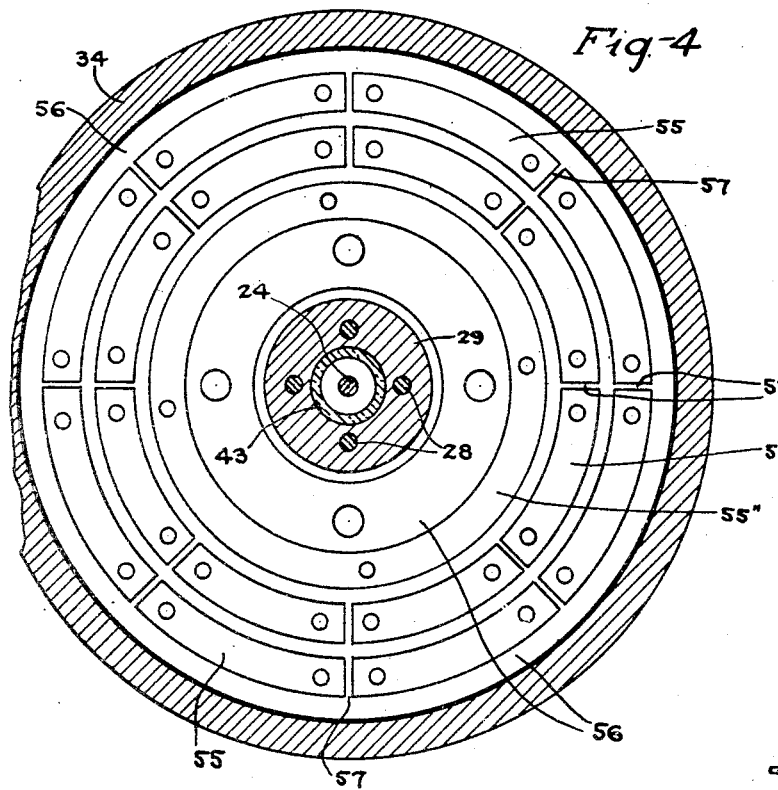
Figure 6:
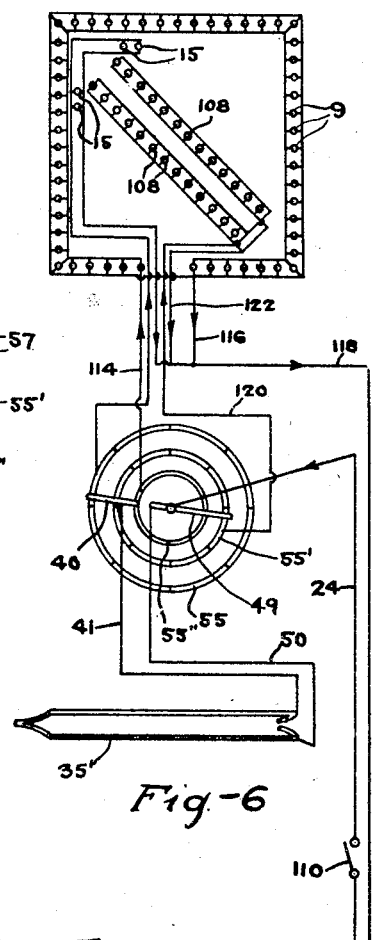
Figure 5:
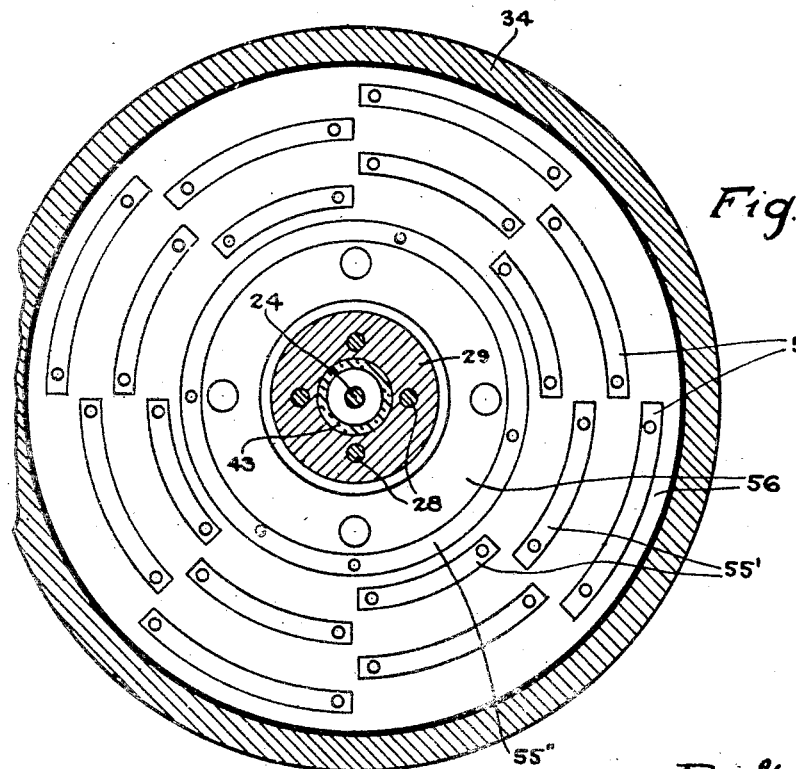
Figure 7:
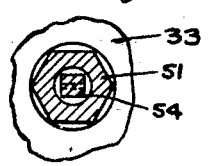
Figures 11, 12, 13:
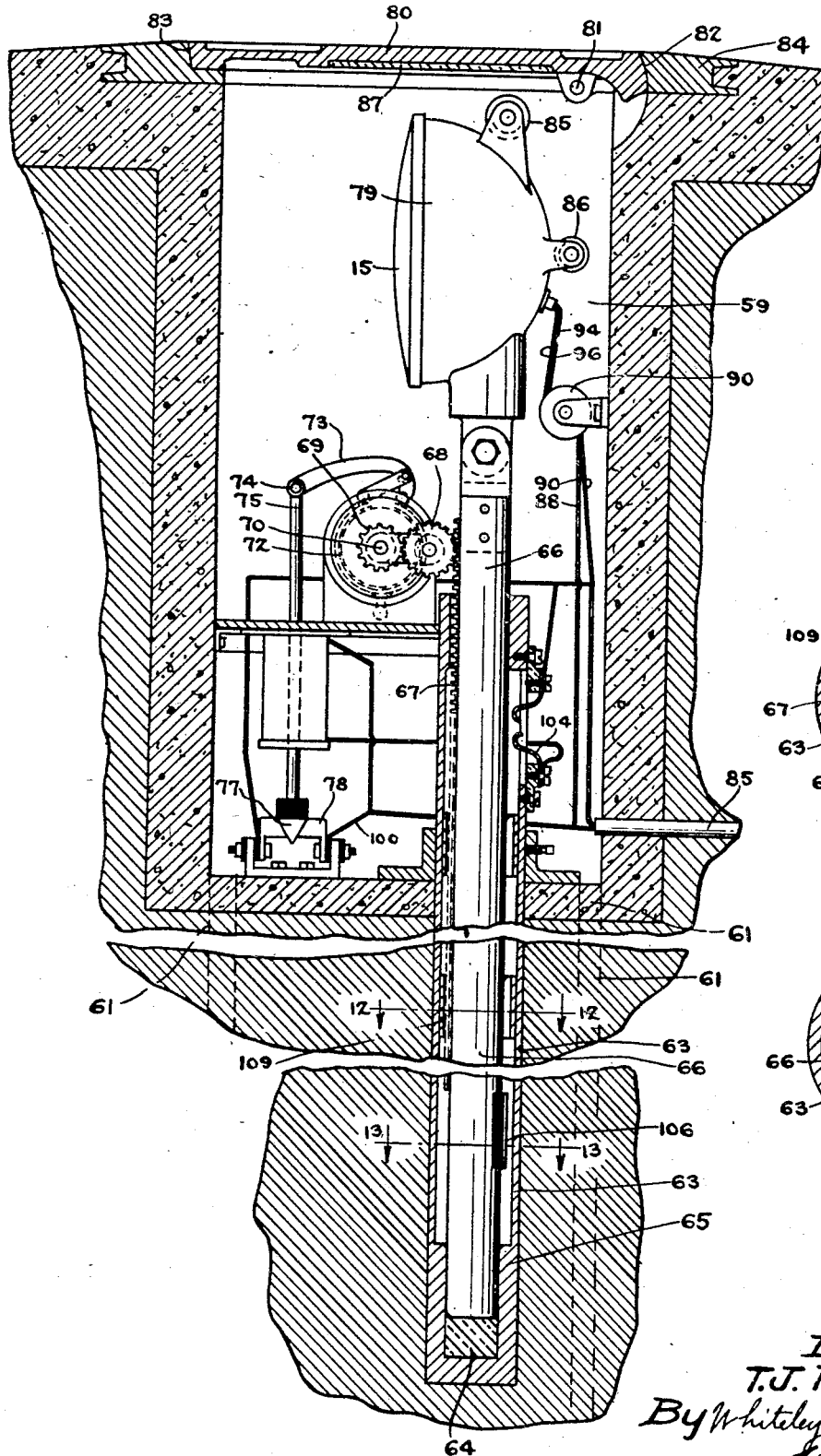

In the drawings illustrating an application of my invention Fig. 1 is a vertical sectional view through a tower support for my wind vane showing the parts supported thereby. Fig. 2 is an elevational view of the tower for supporting the wind vane. Fig. 3 is a top plan view of what is shown in Fig. 1. Fig. 4 is a sectional view of the parts of the electric vane control viewed on the line 4—4 of Fig. 1 in the direction of the arrows. Fig. 5 is a view similar to Fig. 4 showing a modification of the electric control. Fig. 6 is a diagrammatic view showing the manner of putting on the lights. Fig. 7 is a sectional view on the line 7—7 of Fig. 1 viewed in the direction of the arrows. Fig. 8 is a diagrammatic view of the various circuits showing the manner in which they are opened and closed. Fig. 9 is a diagrammatic view indicating generally the arrangement of lights on the field. Fig. 10 is a side elevational view of the motor and brake mechanism for controlling the flood lights. Fig. 11 is an enlarged sectional view showing details of the flood lights and the means for raising and lowering them. Fig. 12 is a sectional plan view on the line 12—12 of Fig. 11 viewed in the direction of the arrows. Fig. 13 is a sectional plan view on the line 13—13 of Fig. 11 viewed in the direction of the arrows.

The general purpose of the invention is indicated diagrammatically in Fig. 9, in which the airport field 10 is shown with transverse landing lanes 11, 12, and diagonal landing lanes 13, 14, each equipped with marginal rows of sunken lights of the character described in my aforesaid application. The outer margins of the field may be permanently lighted as hereinafter described by sunken lights 9 as shown in Fig. 6. It is, however, desirable in such a construction not only to provide sunken lights for outlining the field and the landing lanes or the particular landing lane running into the wind which will be used for the purpose of landing at any time, but in addition thereto, there should be what is known as flood lights, that is powerful lights arranged to throw strong beams of light along the portion of the field where landing is to be effected. Such flood lights designated generally at 15 are indicated at the ends of each landing lane. Any desired number of flood lights may be employed. A convenient number is four at each end of each lane as shown.

It will be readily understood that the most effective landing is possible only when the particular landing lane which is to be used, that is the one running into the wind is outlined by sunken lights and when flood lights at the end of said lane against which the wind blows are in operation. These flood lights in order to give the proper effect must be raised a certain distance above the ground as well as being lighted. It is a particular object of this invention to provide means controlled by the wind whereby the outlining lights of the particular lane running into the wind will be automatically lighted and the flood lights at the end of the lane on which the wind is blowing across the field will be automatically lighted and raised. All of this is accomplished by a wind vane mounted upon a tower located at any convenient point adjacent the field as by mounting it on top of the hangar. I provide a source of electrical energy running through switching or contact making and breaking means associated with said wind vane and to the various light lanes and the appropriate flood lights, and motor mechanism for operating the flood lights also controlled by the circuit-closing and breaking means connected with the wind vane.

Fig. 2 illustrates in general a tower 16 which may be of any desired construction and is preferably formed with a turret 17 available for entrance from the inside of the tower. Within the turret 17 is mounted a spider 18 as shown in Fig. 1 or other form of bracket support which has secured thereto a ring 19 having bolted to the lower portion thereof a cover 20 and to the upper portion a cylindrical housing 21. The cover 20 has a central opening retaining an insulating core 22 through which extends a conducting rod 24 connected to a source of electrical energy. Inside of the housing 21 is formed an annular ledge support 25 upon which is mounted a vertical thrust ball bearing 26, the upper ring 27 of which is clamped in position by bolts 28 extending through a hub piece 29 fast on an annular hub shaft 30. Laterally disposed ball bearings 31 and 32 within the housing 21 in conjunction with the thrust bearing 26 hold this hub shaft for ready rotation around a vertical axis. Secured to the hub piece 29 by the bolts 28 is a circular disk 33 provided with an annular depending flange 34, and upon this disk 33 is mounted a pointed vane 35 of such size and shape as always to point the direction from which the wind comes. This vane is preferably a hollow longitudinal bar having a top aperture closed by a plate 36 as clearly indicated in Figs. 1 and 3. Carried by the vane and exposed for observation from above, there is a neon tube 35' outlining the shape of the vane and lit up from a source of electrical energy. Inside of the vane there are mounted a series of contact plugs 37, 38 and 39, which plugs are alike in character, one of them, 39, being shown in section. Upon the plugs 38 and 39, there is mounted a conducting strip 40 connected by a wire 41 with the neon tube 35'. The rod 24 runs through the center of the annular hub shaft 30 and through an insulating core 42 therein, as clearly shown in Fig. 1. This insulating core is cupped as indicated at 43 and holds a second cup 44 within which is mounted a rotary socket piece 45 into which the conductor 24 is threaded, said socket piece being yieldingly held so as to force the contact point 46 of the conducting rod 24 into engagement with an adjustable block 47 in the cup piece 44. A spring 48 forces the socket piece 45 upwardly, the construction permitting ready rotation or oscillation of the vane 35 without twisting the rod 24. Upon the contact plug 37 and cup piece 44 is mounted a conducting strip 49 connected by a feed wire 50 with the neon tube 35'.

The above arrangement is such that electric current coming through the rod 24 is adapted to enter each of the contact plugs 37, 38 and 39. These contact plugs are insulated from the plate 33 by means of insulating washers 51 of the shape clearly shown in the sectional representation thereof in plug 39 as shown in Fig. 1. Extending through the insulators 51 are contact pieces 52, 53, and 54 adapted respectively to engage with contact strips 55, 55' and 55" carried upon an insulating disk 56. In Fig. 4, the strips 55 and 55' are arranged in concentric circles broken at points 57 corresponding to the points and quarter points of the compass. In the form shown in Fig. 5, the contact pieces are formed in four circles instead of two circles, the pieces being alternately staggered which would require two more contact plugs 37, 38 on the disk 33 to effect the desired results, the purpose in this arrangement being to prevent fluctuating from one contact piece back and forth across the gaps 57 when the wind is variable. The contact piece 55" is in the form of an unbroken ring and hence the plug 39 is always in contact therewith.

The flood lights and means for controlling them are shown in detail in Figs. 11 to 13. A pit 59 of any suitable construction and preferably provided with drainage outlets 61 is formed and from the bottom of this pit there protrudes a steel housing 63 which is provided at its bottom with a rubber plug 64 or other cushioning means, the casing 63 being preferably thickened as indicated at 65 for the purpose of making a seat. Within the casing 63 there is mounted to move vertically, a standard 66 which is provided on one of its sides with a rack 67 meshed by a pinion 68 which in turn meshes with a pinion 69 secured to the shaft 70 of an electric motor 71. As shown in Fig. 10, the shaft 70 projects on the opposite side of the motor and carries a brake drum which is engaged by brake shoes 72, said brake shoes being operated to provide a braking action on the motor by means of a lever arm 73 pivoted at 74 to a core rod 75 which is operated by a solenoid 76 placed within the pit 59. The rod 75 carries at its lower end an insulatively supported contact member 77 adapted to close a switch 78 also mounted in the pit. The standard 66 carries a flood light 15 having a reflector casing 79. As previously intimated, four of these lights are normally directed down one of the landing lanes, the pits containing the lights being located adjacent the end of said lane and the back of the flood lights being turned away from the lane. The pit 59 is closed by a gravity operating door 80 hinged at 81 and having a water-tight seat at 82 and 83 with an annular fiber top piece 84 which rims the upper edge of the pit. The flood light casing 79 carries rollers 85 and 86 adapted to engage a strip 87 on the inside of the door 80 so that when the standard is raised, the door 80 will be lifted, thus permitting the flood light to be projected or lifted out of the pit. An electric cable 85 containing wires connected for operating the flood light, motor, and solenoid extends into the pit. Wires 88 and 90 for supplying current to the light are in electrical contact with a reel 92 instead of being connected directly to the light. Wires 94 and 96 connected with the light and winding on the reel provide for the raising and lowering movement of the light. The wire 88 is connected to one side of the motor 71, the other side of the motor being connected by a wire 98 with one side of the switch 78 the other side of which is connected to a wire 100 which in turn is connected to one of the segments 55. Connected to the wire 100 is a wire 102 which includes the coil of the solenoid 76 and then is connected to one side of a switch 104, the other side of which is connected to the wire 88. The lower portion of the standard 66 insulatively carries a contact piece 106 which when the standard nears the upper end of its travel closes the switch 104. The contact piece 106 travels through a slot 107 formed in a guide piece 109 held between the standard 66 and the housing 63 by set screws 111. By referring to Fig. 9, it will be seen that there are four lanes extending across the field at 45° relation to each other and that there are four of the flood lights 15 at each end of each lane. Each set of four flood lights operates as a unit according to the position of the wind vane. When the wind vane points down a particular lane, the airplane will land in this lane by flying against the wind as is customary in landing and the airplane will pass into the lane over the four flood lights which are illuminating this lane. The manner in which the flood lights are operated will be understood particularly by referring to Fig. 8. The plug 38 is in contact with the proper one of the segments 55 as determined by the position of the vane. Current comes in through the wire 90, goes through the light 15, through the wire 88, motor 71, wire 98, closed switch 78 and out through the wire 100. The motor is thus actuated and the standard is lifted. When the standard 66 has nearly reached the top of its travel the contact member 106 closes the switch 104 so that current now flows through this switch, through the wire 102 including the coil of the solenoid and out through the wire 100. The energization of the solenoid 76 lifts the core rod 75 carrying the contact piece 77 so that the circuit through the motor is broken and the lever 73 causes the brake shoe 72 to be applied to the brake drum of the motor and stops the latter. This holds the flood light in raised position and with current passing therethrough until the wind shifts and brings the contact plug 38 into engagement with another one of the segments 55. When this occurs, the particular set of flood lights is extinguished and drop by gravity back into their respective pits. At the same time, another set of flood lights corresponding to the direction of the wind is operated in the manner just described. Also at the same time that the flood lights for a particular lane are operated, sunken lights 108 along the two margins of this lane are illuminated by means of the engagement of the plug 37 with the proper one of the segments 55'. This will be understood from Fig. 6. With the switch 110 closed, current passes through the rod 24, left portion of the conducting strip 49, wire 50, neon tube 35', wire 41, conducting strip 40, wire 114, sunken lights 9, placed around the margin of the field, and through the wire 116 to the return wire 118. The neon tube 35' and the lights 9 are therefore constantly illuminated through the same connections regardless of the direction of the wind. In regard to the lane lights 108, however, current from the feed rod 24 passes through the right portion of the conducting strip 49, the plug 37, the particular segment 55. engaged by this plug, through the particular wire 120 connected with this segment, through the lights 108 and the wire 122 to the return wire 118. The purpose of providing a plurality of flood lights 15, for instance,—four in number—adjacent the end of a landing lane will be understood from Fig. 9, in which the airplane is assumed to be landing in the direction indicated by the wind vane 35. The rays of light from the flood lights located at this side of the field cross at the center of the field as shown in full lines and combine to produce a diamond shape beam of light whereby shadows ahead of the pilot are prevented.

I claim:

1. Means for lighting airports comprising a pit, a standard carrying a flood light mounted to move vertically in said pit so as to be projected therefrom, a brake for holding said standard in its projected position, means including a motor in said pit and an electric circuit for projecting said floodlight and lighting the same and thereafter rendering the brake effective, and means controlled by the direction of the wind for closing said circuit only when the wind is blowing in a predetermined direction.

2. Means for lighting airports comprising a pit, a supporting device for a floodlight mounted in said pit for movement so as to project the floodlight therefrom, a brake for holding the floodlight in its projected position, means including a motor in said pit and an electric circuit for projecting said floodlight and thereafter rendering the brake effective, and means controlled by the direction of the wind for closing said circuit only when the wind is blowing in a predetermined direction.

In testimony whereof I hereunto affix my signature.

THOMAS J. ROGERS.